Figure 4:
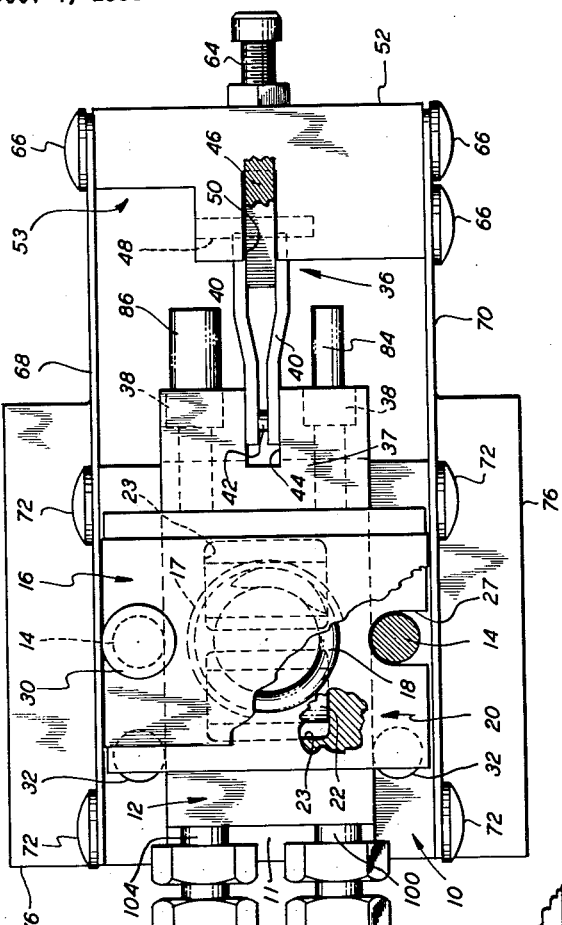

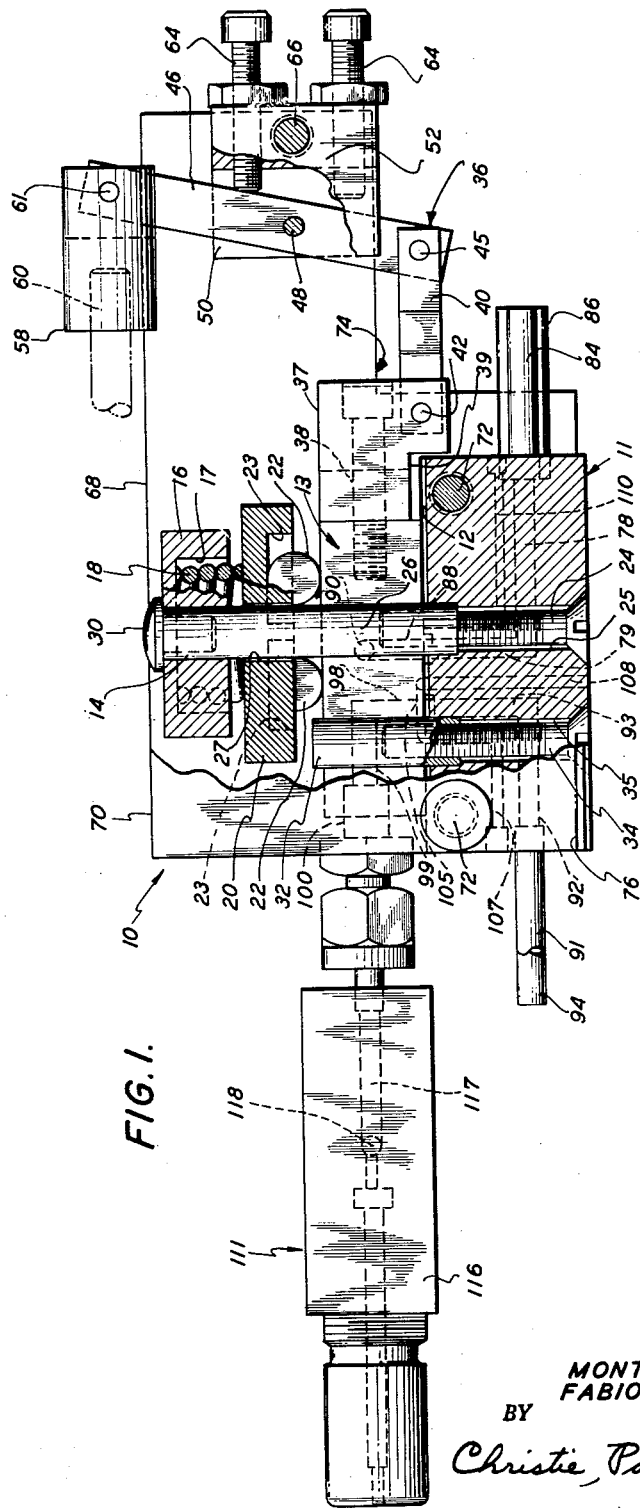
Sept. 19, 1961 — M. L. MARKS ET AL — 3,000,218
CHROMATOGRAPHIC SAMPLING APPARATUS
Filed Dec. 7, 1956 — 5 Sheets-Sheet 1
FIG. I.
INVENTORS.
MONTE LEE MARKS
FABIO C. CALCAPRINA
BY
Christie, Parker & Hale
ATTORNEYS

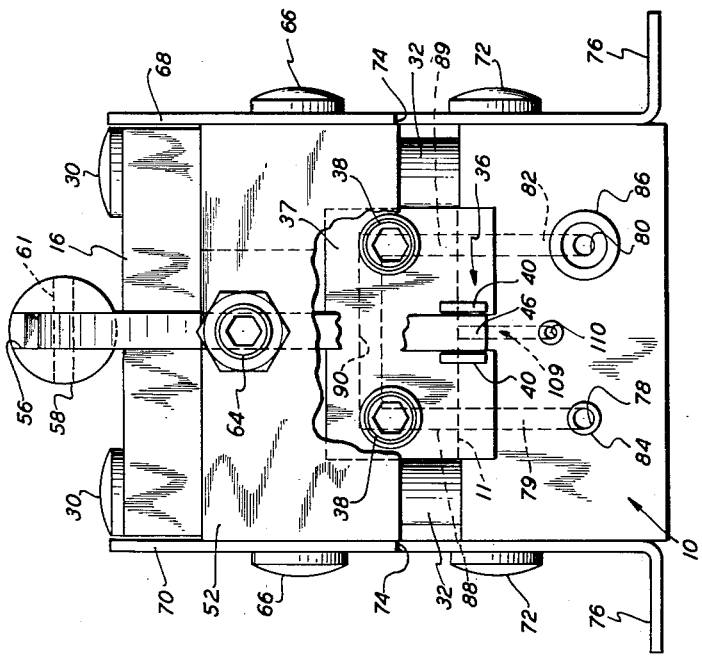
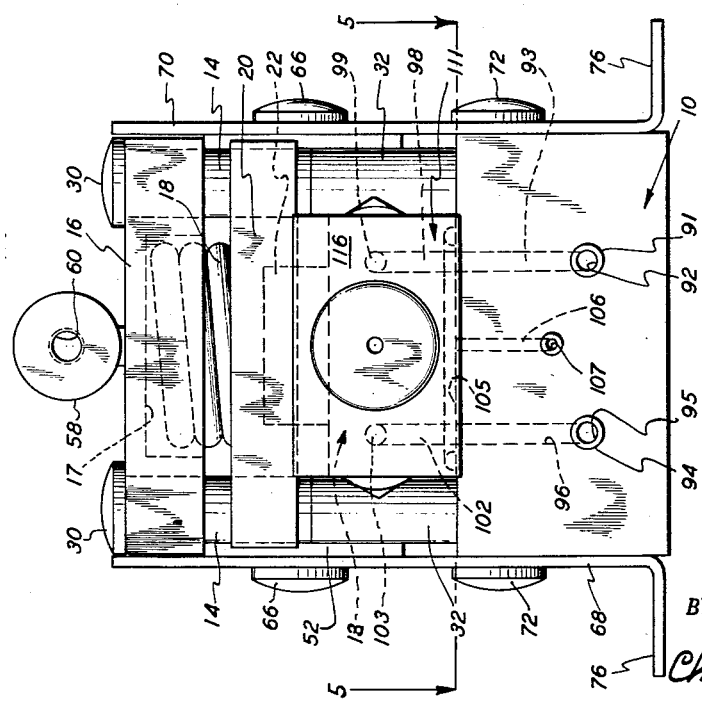

Sept. 19, 1961   M. L. MARKS ET AL   3,000,218
CHROMATOGRAPHIC SAMPLING APPARATUS
Filed Dec. 7, 1956   5 Sheets-Sheet 3

INVENTORS.
MONTE LEE MARKS
FABIO C. CALCAPRINA
BY
Christie, Parker & Hale
ATTORNEYS Sept. 19, 1961    M. L. MARKS ET AL    3,000,218
CHROMATOGRAPHIC SAMPLING APPARATUS
Filed Dec. 7, 1956    5 Sheets-Sheet 5

INVENTORS.
MONTE LEE MARKS
FABIO C. CALCAPRINA
BY
Christie, Parker & Hale
ATTORNEYS

United States Patent Office 3,000,218
Patented Sept. 19, 1961

3,000,218
CHROMATOGRAPHIC SAMPLING APPARATUS
Monte Lee Marks, Pasadena, and Fabio C. Calcaprina, Sierra Madre, Calif., assignors, by mesne assignments, to Consolidated Electrodynamics Corporation, Pasadena, Calif., a corporation of California
Filed Dec. 7, 1956, Ser. No. 626,983
2 Claims. (Cl. 73—422)

This invention relates to apparatus for accurately metering a fluid sample into a fluid carrier stream.

Briefly, the invention contemplates a metering or sampling device comprising a body assembly having two sections held in sliding contact by compression. The body assembly includes a sample chamber of known volume and having inlet and outlet passages which are adapted to be connected to at least two fluid streams. One section of the body has passages in it spaced and disposed for selectively connecting the sample chamber to any of the fluid streams, and means are provided for moving the position of one section of the body assembly with respect to the other to permit selection of a known volume of sample from one of the fluid streams and introduction of the sample into another of the said fluid streams.

The preferred embodiment of the invention is an all-metal metering valve which uses no gaskets and which can introduce accurately metered volumes of fluid sample into a carrier stream at temperatures well above 180° C. This metering apparatus is particularly useful in analytical work such as chromatography in which an accurately measured volume of sample to be analyzed must be introduced into a fluid carrier stream at a temperature sufficiently high to prevent condensation of the sample before it reaches an analytical column. Many samples must be metered at temperatures exceeding 180° C. Under such conditions, the use of present metering devices is prohibited.

The preferred embodiment includes a metallic first block having a smooth surface and a second metallic block having a smooth surface adapted to slide on the smooth surface of the first block. A first pair of spaced conduits are provided within the first block, and one end of each of the first pair of conduits opens in the smooth surface of the first block. The second block has a smooth surface of the first block. The second block has a second pair of spaced conduits within it, and one end of each of the second pair of conduits opens in the smooth surface of the second block. The ends of the second conduits opening in the smooth surface of the second block are spaced from each other by a distance equal to the spacing between the ends of the first conduits opening in the smooth surface of the first block so that as the two blocks are slid with respect to each other, the ends of the conduits opening in their respective surfaces can be brought into and out of communication with each other.

Preferably, the two smooth surfaces are lapped to make a close fit, and the blocks are held together by a compressive spring which bears against suitable bearing elements to permit one block to slide with respect to the other. Also, the sliding surfaces of the blocks are treated, such as by coating, to have different hardnesses, and thereby improve their sliding and wearing characteristics.

Figure 5:
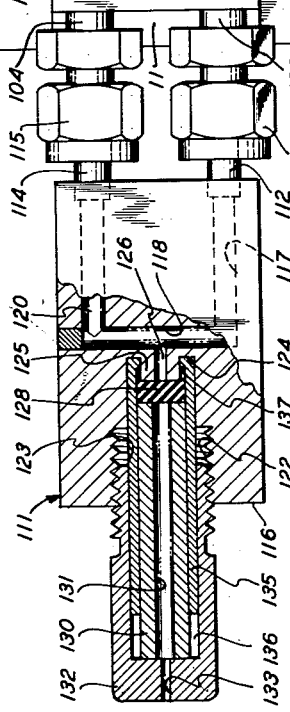
Figure 6:
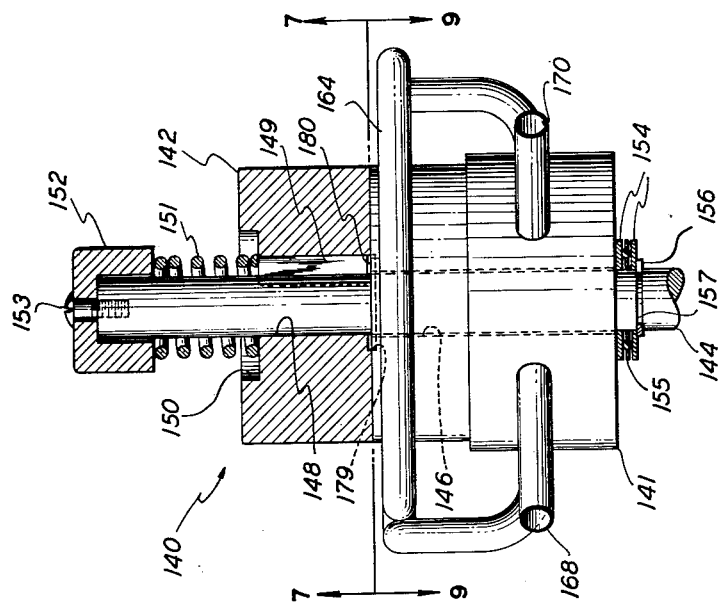
Figure 7:
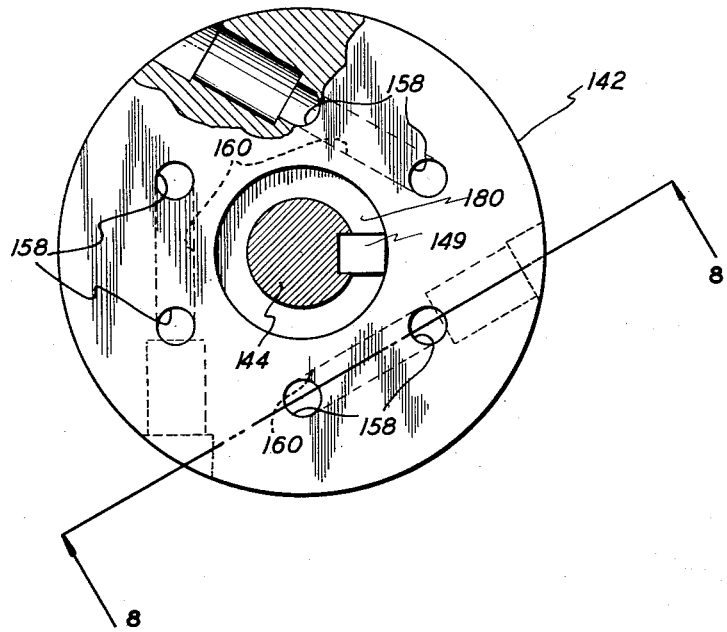
Figure 8:
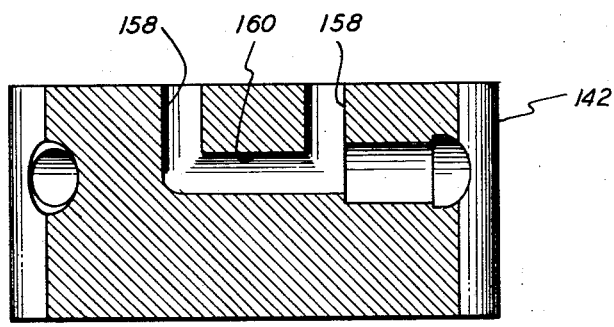

These and other aspects of the invention will be more fully understood from the following detailed description taken in conjunction with the accompanying drawings in which:

FIG. 1 is a side elevation, partially broken away and partially in section, of the presently preferred embodiment of the invention;
FIG. 2 is an elevation of the forward end of the apparatus of FIG. 1;
FIG. 3 is an elevation of the rear end of the apparatus of FIG. 1;
FIG. 4 is a top plan view, partially broken away, of the apparatus of FIG. 1;
FIG. 5 is a fragmentary sectional view taken on line 5—5 of FIG. 2;
FIG. 6 is an elevation, partially in section, of another embodiment of the invention;
FIG. 7 is a view taken on line 7—7 of FIG. 6;
FIG. 8 is a view taken on line 8—8 of FIG. 7; and
FIG. 9 is a view taken on line 9—9 of FIG. 6.

Referring to the drawings, the metering valve includes a body assembly 10 having a first or lower horizontal and rectangular block or section 11 which is approximately twice as wide as it is high and slightly longer than it is wide. A longitudinal raised platform 12 is formed integrally in the center of the top of the lower block and extends for the entire length of the block. The surface of the platform is diamond ground and lapped to be smooth within 7 to 10 micro inches of true flat.

An upper horizontal and rectangular block or section 13 is disposed on the surface of the lower block platform and is adapted to slide longitudinally with respect to the lower block. The upper block is approximately twice as wide as it is high, and half again as long as it is wide. The length of the upper block is somewhat less than the length of the lower block, and the width of the upper block is equal to the width of the lower block platform.

The upper block is held down against the lower block by a pair of vertical connector posts 14 which extend up through the lower block on opposite sides of the platform near the middle of the block, and which extend up through opposite ends of a rectangular retainer cap 16. The under side of the retainer cap has a vertical cylindrical recess 17 which receives the upper end of a compression spring 18 having its lower end resting on the center of a rectangular roller race 20 which in turn bears down against a pair of horizontal and transverse rollers 22 which are each in a respective roller recess 23 formed in the underside of the race to provide a rolling contact between the roller race and the top of the upper block.

Each connector post 14 includes an inverted vertical flathead screw 24 disposed in a vertical bore 25 in the lower block and screwed into the lower end of a cylindrical connector post guide sleeve 26. The lower end of the bore 25 is tapered downwardly and outwardly so that the flathead of the screw is flush with the bottom of the lower block, and the upper end of the bore 25 is stepped to an increased diameter to receive the lower end of the guide sleeve. The guide sleeve extends up through a recess 27 in the side of the roller race and through the retainer cap which is held down by a round head screw 30 threaded into the upper end of the guide sleeve.

A pair of cylindrical forward guide sleeves 32 are mounted on opposite sides of the upper block forward of the connector posts. Each forward guide sleeve is threaded at its lower end on to the upper end of a flathead screw 34 which is disposed in a bore 35 shaped like bore 26 to accommodate the flathead of the screw 34 and the lower end of the guide sleeve 32. The upper end of each forward guide sleeve terminates just above the top of the upper block. Each guide sleeve is located so that its innermost portion makes a sliding fit with a side of the upper block so that the upper block is free to slide longitudinally with respect to the lower block and is prevented from lateral movement by the guide sleeves.

The upper block is moved longitudinally with respect to the lower block through a linkage system 36 at the rear of the valve. The linkage system includes a lower arm support block 37 connected to the rear of the upper block by a pair of laterally spaced, horizontal screws 38. A notch 39 is in the forward and lower edge of the support block 37 to fit over the rear and upper edge of the upper block. A pair of longitudinal, horizontal, and laterally spaced linkage arms 40 are secured at their forward ends by a transverse horizontal pin 42 in a vertical notch 44 in the lower and rear end of the lower arm support block. The forward ends of the horizontal linkage arms are parallel and close together, the intermediate portion of the arms are bent outwardly, and the rear ends of the arms are parallel and spaced apart. The rear ends of the horizontal linkage arms are secured by a transverse horizontal pin 45 on opposite sides of the lower end of an upright linkage arm 46 which is connected by a transverse horizontal pin 48 to pivot in a vertical slot 50 in the forward end of a linkage support block 52. As shown best in FIG. 4, a notch 53 is cut in the forward and right hand edge of the linkage support block 52 to provide easy access for pin 48. The upper end of the upright linkage arm is disposed in a vertical slot 56 in the rear end of a connecting rod cylinder 58 which has a longitudinal threaded bore 60 at its forward end adapted to receive a connecting rod (not shown) for actuating linkage. The upper end of the upright linkage arm is pivotally secured to the connecting rod sleeve by a transverse horizontal pin 61.

A pair of vertically spaced and horizontal adjustable stop screws 64 are threaded into the rear end of the linkage support block 52 to extend into the slot 50 and provide adjustable stops to limit the travel of the upright linkage arm in the clockwise and counter-clockwise directions. The linkage support block is held in place by horizontal screws 66 which are threaded into it through a right hand (as viewed in FIG. 3) side support plate 68 and a left hand (as viewed in FIG. 3) side support plate 70. Each of the side support plates are secured to the lower block by horizontal screws 72. The rear and lower edge of each side support plate is cut away to leave a large notch 74 to permit ready access to the linkage system. The lower edge of each side support plate is bent outwardly to provide a horizontal lip 76 to permit the valve to be mounted on a suitable support (not shown).

A horizontal inlet carrier fluid conduit 78 extends longitudinally from the rear end of the left side of the lower block to the central portion of the block where it is joined by a vertical inlet carrier fluid conduit 79 which opens in the lapped surface of the lower block platform. A horizontal outlet carrier fluid conduit 80 extends longitudinally from the rear end of the right side of the lower block to the interior of the lower block for a distance equal to that of conduit 78. The inner end of conduit 80 is joined by a vertical carrier fluid conduit 82 which opens at its upper end in the lapped surface of the platform. A carrier inlet connector tube 84 is welded to the rear end of conduit 78 and is adapted to be connected to a source (not shown) of carrier gas, e.g., hydrogen. A sample outlet connecter tube 86 is welded to the rear end of conduit 80 and is adapted to be connected to a chromatographic analyzing column (not shown).

A first vertical carrier fluid conduit 88 extends from the left hand side of the lapped surface of the bottom of the upper block into the upper block, and a second vertical carrier fluid conduit 89 is laterally spaced from conduit 88 and extends from the right hand side of the lapped surface of the bottom of the upper block into the upper block. The upper ends of conduits 88 and 89 are connected by horizontal and transverse carrier bypass conduit 90, and with the upper block in the position shown in the drawings, conduits 88 and 89 are collinear with conduits 79 and 82 respectively, so that carrier fluid may enter the carrier fluid inlet, pass horizontally through conduit 78, up conduit 79, across the interface between the upper and lower blocks, upwardly through conduit 88, across the upper block in conduit 90, down the upper block in conduit 89, across the interface between the two blocks, down conduit 82 in the lower block, and out of the block through outlet conduit 80.

The outer end of a sample inlet tube 91 is adapted to be connected to a sample source (not shown), and has its inner end welded in the outer end of a horizontal sample inlet conduit 92 which extends longitudinally from the forward and left hand side of the lower block into the lower block. The inner end of conduit 92 is connected to the lower end of a vertical conduit 93 which opens at its upper end in the left hand side of the lapped platform surface of the lower block.

The inner end of a sample outlet tube 94 is welded in the outer end of a horizontal sample conduit 95 which extends inwardly and longitudinally from the forward and right hand side of the lower block. The inner end of conduit 95 joins the lower end of a vertical conduit 96 opening at its upper end in the right hand side of the surface of the platform.

A first vertical conduit 98 begins in the surface of the left hand side of the bottom of the upper block and terminates at the inner end of a horizontal and longitudinal conduit 99 which opens at the right hand side of the forward end of the upper block. A connecting tube 100 has its inner end welded in an enlarged portion of the forward end of conduit 99. A second vertical bore 102 laterally spaced from the first bore 98 begins in the right hand side of the surface of the bottom of the upper block and terminates at the inner end of a horizontal conduit 103 which opens at the right hand side of the forward end of the upper block. A connecting tube 104 has its inner end welded in an enlarged portion of the outer end of bore 103. The vertical bores 98 and 102 in the upper block are spaced so that they are collinear with vertical bores 93 and 96, respectively, in the lower block, when the upper block is in the position shown in the drawings.

An elongated transverse guard groove 105 in the smooth surface of the upper block surrounds the lower ends of conduits 98 and 102. The upper end of a vertical sample pressure equalizer conduit 106 opens in the smooth surface of the lower block at the forward portion of the guard groove, when the valve blocks are in the position shown in FIG. 1. A horizontal and longitudinal conduit 107 extends from the forward end of the lower block to the lower end of conduit 106, and is adapted to be connected by suitable means (not shown) to the sample source. The upper end of a vertical exhaust conduit 108 opens in the surface of the lower block at the rear portion of the guard groove, when the valve blocks are as shown in FIG. 1, and opens at its lower end to atmospheric pressure at the bottom of the lower block. The upper end of a vertical carrier pressure equalizer conduit 109 opens in the smooth surface of the lower block slightly to the rear of carrier conduits 79 and 82. A horizontal and longitudinal conduit 110 extends from the rear end of the lower block to the lower end of conduit 109 and is adapted to be connected by suitable means (not shown) to the carrier source. Conduits 106, 108, and 109 are longitudinally spaced along the center line of the lower block so that as the upper block slides to the rear of the position shown in FIG. 1, the guard groove is momentarily in simultaneous alignment with the exhaust conduit and the carrier conduits opening in the upper surface of the lower block.

An adapter 111 is connected through a first tube 112 by a coupling 113 to the outer end of tube 100. The adapter is also connected through a tube 114 (see FIG. 4) by a second coupling 115 to the outer end of tube 104.

The adapter has a rectangular body 116 almost twice as long as it is wide and approximately one-half as thick as it is wide. The forward end of tube 112 is welded into the rear end of a first horizontal conduit 117 which extends longitudinally from the left hand side of the rear end of the body and terminates in the body at the left hand end of a transverse horizontal bore 118 in the adapter body. The right hand end of bore 118 terminates in a longitudinal and horizontal bore 120, which opens at the right hand side of the rear end of the adapter body to receive the forward end of tube 114 which is welded in it. A threaded horizontal bore 122 extends longitudinally from the forward end of the adapter body and is stepped down to a reduced smooth bore 123 which terminates in an annular groove 124, leaving a boss 125 at the inner end of bore 123. A small horizontal bore 126 extends longitudinally through boss 125 to connect bore 123 with conduit 118. A diaphragm 128 of silicon rubber is held over the forward end of bore 126 by a tubular needle guide 130 disposed coaxially in bore 123 and held in place by a hollow injection plug 132 screwed to bore 122 and having a horizontal bore 133 which is collinear with a bore 131 in the needle guide, and with bore 126. An injection sleeve 135 is disposed in an annular space 136 between the injection plug and the needle guide. The inner end of the injection sleeve is in the annular groove 124 and has an inwardly turned annular lip 137 which facilitates the withdrawal of the diaphragm when necessary.

The operation of the metering valve is relatively simple. With the valve set in the position shown in the drawings, a sample gas, such as hydrocarbon, flows in sample tube 91, through conduits 92, 93, 98 and 99, successively, to pass out of the upper body through tube 100. The sample gas then flows through coupling 113, tube 112 and conduits 117, 118 and 120 in the adapter body. The gas sample then flows out of the adapter body through tube 114, coupling 115, and back into the upper block through the tube 104 and conduits 103 and 102 in the upper block. The gas sample then flows through conduits 96 and 95 in the lower block and out tube 94 to discharge. With the valve in this position, an accurately known quantity of sample gas is in the conduits in the adapter, the upper block, and in the connecting tubes.

The sample may be at any suitable pressure, but it is usually slightly above atmospheric pressure. The guard groove is supplied sample at the pressure of the sample by the sample pressure equalizer conduit so that there is no pressure gradient between the groove and the sample conduits. The sample flows through the groove and out the exhaust conduit. If the sample is handled at sub-atmospheric pressure, the exhaust conduit is connected to a suitable vacuum to maintain flow of sample through the guard groove.

A carrier fluid or gas, such as hydrogen, enters the lower block through tube 84 and passes through conduits 78 and 79. The gas then flows into the upper block through conduits 88, 90, and 89 to pass back into the lower block through conduits 82 and 80 and then out the lower block through tube 86 to the chromatographic column.

When it is desired to transfer the accurately metered volume of sample gas to the chromatographic column, the connecting rod cylinder 58 is moved forward so that the linkage is actuated to slide the upper block to the rear by an amount equal to the distance between bores 93 and 79, the lower stop screw 64 insuring that the block moves this exact distance.

As the valve is moved toward the new position the rear side of the guard groove moves over the carrier conduit opening in the surface of the lower block at the same time the forward side of the groove moves over the exhaust conduit. This provides a brief charge of carrier in the groove to displace the sample.

With the metering valve in the new, or sample transfer position, the carrier gas flows into the upper block through conduit 98 so that it displaces the sample from the conduits in the upper block, the adapter body, and the tubes connecting the adapter body to the upper block. In this way an accurate volume of sample is delivered by the carrier gas to the chromatographic column. To recharge the valve to introduce another sample, the valve is simply returned to the position shown in the drawings.

In the sample transfer position, the guard groove is over the carrier pressure equalizer conduit so that carrier is supplied to the groove at carrier pressure, say about 35 p.s.i. Thus there is no pressure gradient between the sample posts and the guard groove, reducing the possibility of the sample leaking from the valve.

To facilitate valve operation and insure long life, the blocks are preferably made of a durable metal and suitably lubricated. For example, in a valve of the type just described, the lower block was made of stainless steel, type 440 C, heat treated to a hardness of 60 Rockwell C, and flame coated with tungsten carbide. The upper block was made from a high nickel steel bearing material which was softer than the lower block. The sliding surfaces of the two blocks were lubricated with an inert, high temperature (good up to 400° F.) silicone grease sold by Dow Corning as "Heat Stable Silicone Grease."

In an actual run, the carrier gas was under a pressure of 25 p.s.i.g., and the sample gas was at about atmospheric pressure and no leaks were detected in the valve during its operation.

In the event that samples of different volumes are required, the couplings which attach the adapter to the upper block may readily be disconnected, permitting a different adapter to be connected to the upper block.

If a sample which is liquid at room temperature and pressure is to be introduced to the chromatographic column, it is injected into bore 118 of the adapter body by using a hypodermic needle to pierce the diaphragm 128. The temperature of the carrier gas and the equipment should be sufficiently high to insure that all of the components in the liquid sample are vaporized as they enter the metering volume, and remain vaporized until reaching the chromatographic column. During the introduction of a liquid sample, the upper block is slid to the right so that bores 98 and 102 in the upper block are aligned with bores 93 and 96, respectively, in the lower block. Thus, the carrier gas flows through the adapter body to pick up the vaporized sample as it enters conduit 118 of the adapter body.

FIGS. 6 through 9 show another embodiment of the invention in the form of a rotary valve 140 which includes a lower fixed and upright cylindrical body 141, and an upper rotatable and upright cylindrical body 142 with its bottom surface disposed to slide on the top surface of the fixed body. A vertical rotatable shaft 144 is journalled through a bore 146 in the center of the fixed body. The upper portion of the shaft passes through a bore 148 in the center of the rotatable body and is secured by a key 149 to the rotatable body. An annular recess 150 in the top surface of the rotatable body around bore 148 receives the lower end of a compression spring 151 coaxially disposed around the upper end of the shaft. A spring retainer cap 152 is secured by a screw 153 to the upper end of the shaft and holds the spring in compression so that the bottom surface of the rotatable body bears against the top surface of the fixed body.

A pair of washers 154 on opposite sides of a ball bearing 155 are held against the bottom surface of the fixed body by a C-ring 156 disposed in a retaining groove 157 in the shaft. The shaft is adapted to be turned by any suitable means so that the rotatable body may be rotated with respect to the fixed body.

As with the valve shown in FIGS. 1 through 5, the sliding surfaces of the rotary valve are lapped so that they make a smooth gas-tight fit. These surfaces also are suitably treated and lubricated as described with the valve of FIGS. 1 through 5.

Referring to FIGS. 7 and 8, the rotatable body includes three pairs of vertical (as viewed in FIG. 8) bores 158 which open in the bottom (as viewed in FIG. 6) surface of the fixed body. The bores 158 are spaced at 60° intervals around and equidistant from the axis of the shaft, and terminate in the intermediate portion of the rotatable body. The inner ends of each pair of vertical bores 158 are connected by respective horizontal (as viewed in FIG. 8) bore 160.

The fixed body has six vertical bores 162 opening in its upper surface. Bores 162 are spaced at 60° intervals and are equidistant from the shaft axis by an amount equal to that of bores 158. The opposite ends of a sample tube 164, which is disposed in the form of a spiral around the fixed body, are connected by respective horizontal bores 166 to the lower ends of a pair of diametrically opposed bores 162 in the fixed body. A sample inlet conduit 168 is connected through a horizontal bore 169 to the lower end of another of the vertical bores 162, and an exhaust tube 170 is connected through a horizontal bore 172 to the lower end of vertical bore 162 which is adjacent the sample conduit and not connected to a sample tube. The other two vertical bores 162 are respectively connected to a carrier gas inlet tube 174 and an analyzing column tube 176 through horizontal bores 177, 178, respectively.

The top surface of the fixed body is provided with an annular recess 179 around the shaft to match a similar recess 180 in the bottom surface of the rotatable body to provide a sump for any foreign particles which might find their way into the valve along the shaft.

The operation of the valve of FIGS. 6 through 9 is relatively simple. With the rotatable body set to provide communication between the sample inlet and the adjacent end of the sample tube, sample flows in the sample inlet tube, through bore 169, up the connected bore 162, up the collinear bore 158 in the rotatable block, across horizontal bore 160, and down the other bore 158 which is collinear with bore 162 in the fixed body and connected through bore 166 to one end of the sample tube. The sample flows around the sample tube and enters the opposite side of the fixed body through horizontal bore 166. The sample then flows up vertical bore 162, up collinear bore 158 in the rotatable block, across horizontal bore 160, down a vertical bore 158, down vertical bore 162 which is connected at its lower end through horizontal conduit 172 to the exhaust tube. The flow of carrier gas may be traced in a similar manner from the carrier inlet, through the rotatable and fixed bodies and out the tube leading to the analyzing column.

To transfer sample from the sample tube to the analyzing column, the shaft is simply rotated 60° clockwise (as viewed in FIG. 9) so that the sample in the sample tube is connected across the carrier inlet tube and the analyzer tube, thus causing the sample to be displaced from the sample tube into the analyzer column. At the same time, the sample inlet and exhaust conduits are interconnected so that the flow of sample is uninterrupted.

We claim:

1. A metering device comprising a first metal body having a smooth surface, a second metal body having a smooth surface, means for compressively holding the two surfaces together to make a metal-to-metal sliding contact seal, one of the surfaces being harder than the other, means for sliding the bodies with respect to each other between first and second positions, the first body having first, second, third, and fourth conduits opening at spaced locations out of the smooth surface of the first body, the first conduit being connected to a first fluid stream and the second conduit being connected to a second fluid stream, a sample chamber having inlet and outlet passages, conduit means opening out of the surface of the second body and having first means for connecting the second and fourth conduits in series and second means for connecting the sample chamber in series with the first and third conduits when the bodies are in the first position, said second means being operable to connect the sample chamber in series with the second and fourth conduits when the bodies are in the second position, the smooth surface of the second body having a guard groove disposed around said second means of said conduit means, means for connecting the guard groove to the first fluid stream when the bodies are in the first position, and means for connecting the guard groove to the second fluid stream when the bodies are in the second position.

2. Apparatus according to claim 1 which includes means for flushing the guard groove with one of the fluid streams as the bodies are moved from one position to the other.

References Cited in the file of this patent
UNITED STATES PATENTS

| | | |
|---|---|---|
| 2,591,762 | Zaikowsky | Apr. 8, 1952 |
| 2,757,541 | Watson | Aug. 7, 1956 |
| 2,830,738 | Sorg et al. | Apr. 15, 1958 |
| 2,833,151 | Harvey | May 6, 1958 |
| 2,841,005 | Coggeshall | July 1, 1958 |

OTHER REFERENCES

Articles by N. H. Ray, Gas Chromatography in Journal Applied Chemistry, vol. 4, February 1954, pages 82–85 and 21–24.